United States Patent [19]
Birch et al.

[11] Patent Number: 5,148,670
[45] Date of Patent: Sep. 22, 1992

[54] GAS TURBINE COGENERATION APPARATUS FOR THE PRODUCTION OF DOMESTIC HEAT AND POWER

[75] Inventors: Peter H. Birch, Woodingdean; Toshiyuki Kondo, Brighton, both of United Kingdom; Katsuhiro Mori, Aichi, Japan

[73] Assignee: Aisin Seiki Kabushiki Kaisha, Kariya, Japan

[21] Appl. No.: 727,381

[22] Filed: Jul. 5, 1991

Related U.S. Application Data

[63] Continuation of Ser. No. 330,275, Mar. 29, 1989, abandoned.

[30] Foreign Application Priority Data

Mar. 31, 1988 [GB] United Kingdom ........... 8807664

[51] Int. Cl.$^5$ ............... F02C 3/00; F02C 7/27
[52] U.S. Cl. ............... 60/39.142; 60/39.41; 60/39.511
[58] Field of Search ............ 60/39.5, 39.511, 39.161, 60/39.143, 39.182, 39.41, 39.43

[56] References Cited

U.S. PATENT DOCUMENTS

| | | | |
|---|---|---|---|
| 3,369,361 | 2/1968 | Craig | 60/39.5 |
| 3,487,482 | 1/1970 | Maljanian | 60/39.511 |
| 4,154,055 | 5/1979 | Pulick et al. | 60/39.5 |
| 4,414,805 | 11/1983 | Walker | 60/39.5 |
| 4,502,277 | 3/1985 | Papastavros | 60/39.41 |
| 4,875,436 | 10/1989 | Smith et al. | 60/39.182 |

FOREIGN PATENT DOCUMENTS

| | | |
|---|---|---|
| 81/00878 | 4/1981 | PCT Int'l Appl. |
| 612237 | 11/1948 | United Kingdom |
| 651166 | 3/1951 | United Kingdom |
| 1442367 | 7/1976 | United Kingdom |

Primary Examiner—Richard A. Bertsch
Assistant Examiner—Timothy S. Thorpe
Attorney, Agent, or Firm—Burns, Doane, Swecker & Mathis

[57] ABSTRACT

An apparatus for the domestic cogeneration of heat and electrical energy utilizing an inverted Brayton cycle gas turbine, a combustion chamber, an electrical generator and a compressor. Combustion air is preheated in a heat exchanger by gaseous combustion gases or exhaust gases exiting from the turbine. The combustion air is supplied at substantially atmospheric pressure to the combustion chamber where fuel is burned. The cooled gaseous combustion gases exiting from the heat exchanger are then fed to the compressor where they are recompressed to atmospheric pressure, and are finally used to heat the working fluid of a domestic heating system before being exhausted to the atmosphere. The apparatus can also include an acoustically and thermally insulated housing, an electric air blower for start-up, an engine ignition device, a frequency converter which conditions the electric generator output for connection to the main supply and a control system which is cooled by the engine intake air and which detects thermal and electrical demand and adjusts the engine power accordingly.

13 Claims, 2 Drawing Sheets

GAS TURBINE COGENERATION APPARATUS FOR THE PRODUCTION OF DOMESTIC HEAT AND POWER

This application is a continuation of application Ser. No. 07/330,275, filed Mar. 29, 1989 now abandoned.

BACKGROUND OF THE INVENTION

1. Field of the Invention

The invention relates to gas turbine apparatus for the generation of electrical power on a domestic scale, preferably with the simultaneous production of heat usable for domestic heating.

The simultaneous and in situ generation of heat and electric power (known as cogeneration) on a domestic scale can be advantageous in that a greater total energy efficiency for a particular building and for the nation is possible than when the electrical power is generated centrally for distribution to the building.

Legislation in most countries now permits and encourages private generation of electrical power especially for combined heat and power projects. This legislation also allows private generators to operate electrical generating equipment in parallel with the main supply.

Currently the smallest commercial cogeneration equipment available has an electrical power rating of approximately 15 kW. In general, packaged cogeneration equipment of this size is too large for domestic use where electrical power ratings of approximately 1 kW would be more appropriate.

2. Description of the Related Art

To date, low power cogeneration systems (PCSs) have almost exclusively been based on reciprocating engines of the automotive type and converted in most cases to run on fuels such as natural gas. The manufacturer of low power PCSs has benefitted from the economies of scale associated with automotive production. PCSs of this type, such as that of U.S. Pat. No. 4,226,214, yield total energy efficiencies approaching 90% and can theoretically achieve payback periods of less than three years.

However, in small scale applications such as a domestic combined heat and power unit, the reciprocating engine suffers from at least the following drawbacks; noise and vibration, the need for regular maintenance and lastly, a relatively short operating life.

Gas turbine based cogeneration systems currently tend to have larger power outputs, typically at least about one megawatt, and very few companies offer a PCS based on a gas turbine which has a low power rating.

Gas turbine PCSs for domestic use are for the present not available because in order to achieve low shaft output powers, conventional gas turbines either must be very small and thus inherently be very high speed devices or must operate under conditions which are not optimum from a design point of view, i.e. on part load. Each of these methods is inherently disadvantageous.

In the first instance, the low power implies a small air mass flow rate which dictates the need for miniature components which operate at high speed as a direct result of increasing pressure ratio and density. Such small components theoretically have high efficiencies but in practice constructional tolerances and operating clearances diminish the thermodynamic performance. Part load operation of gas turbines in general requires a reduced turbine entry temperature and lower pressure ratios which, by the laws of thermodynamics, results in a lower brake power thermal efficiency.

Mechanical losses will account for proportionally more of the shaft output power as a larger machine is operated at part load, reducing the brake power thermal efficiencies still further.

A further disadvantage of conventional gas turbines is the high combustion pressure which necessitates a higher fuel pressure. The requirement to pressurize the fuel results in the output shaft power being negated by the amount of work necessary to pressurize the fuel, further decreasing the brake power thermal efficiencies. Also, provision must be made in the plant for pressurizing the fuel which necessitates additional space requirements and expense. However, in the domestic situation a gas turbine based PCS has the advantages of reduced maintenance, greater design life and reduced noise and vibration, making it compatible with the intended environment.

SUMMARY OF THE INVENTION

An object of this invention is the production of electrical power in a range from less than 1 kW up to 10 Kw, advantageously together with heat energy in the form of hot water, substantially for the purpose of domestic scale use.

The invention provides an apparatus for the domestic production of electricity, advantageously conjointly with usable heat, comprising:

a heat exchanger in which combustion air is preheated;

a combustion chamber in which fuel is burned in the preheated combustion air to form gaseous combustion gases;

at least one turbine in which the gaseous combustion gases are expanded and perform work, the turbine or turbines being connected to drive a compressor and an electrical generator; and means for passing the gaseous combustion gases from the turbine or turbines through the heat exchanger to preheat combustion air and hence to the compressor for recompression.

In a preferred embodiment, a gas turbine engine is utilized which operates on an inverted Brayton cycle. The component configurations are depicted in FIG. 1 and FIG. 2. Inversion of the Brayton cycle for the production of low shaft powers creates specific advantages when compared with conventional gas turbines while retaining the favorable characteristics and features that make a turbine preferable to a reciprocating engine for the purpose of producing combined heat and power for domestic use.

In the preferred embodiment, the invention provides a PCS which operates on an inverted Brayton cycle. That is to say, during the cycle the pressure is reduced rather than increased as is conventional. The gas turbine engine drives an electric generator for the production of electrical power. Heat recovery is effected by the placement of a heat exchanger in the exhaust stream of the engine. By this means, effective use of an original energy source such as liquid or gaseous fuel is sought.

An important feature of this invention is the effect of inverting the Brayton cycle and the consequent change in working fluid density. Working fluid density has a major influence on the design of efficient turbines and compressors. A conventional gas turbine engine designed for low power duties has miniature sized components operating at very high speed. This is a consequence of the working fluid density increasing in the normal way. These miniature components can be designed theoretically to be efficient but unfortunately in practice the effect of constructional tolerances and operating component clearances usually negate their performance.

Inversion of the Brayton cycle means that the machine operates at a pressure below atmospheric. The consequent reduction in working fluid density increases the size of the machine. This is a feature which completely opposes the basic advantage of a normal Brayton cycle gas turbine which is a high working fluid density machine. However, in this case where low power is required, the turbines and compressors can be designed and constructed with the advantages of conventional size, conventional materials and conventional rotational speeds.

The aforementioned features of the invention create the added advantage that current manufacturing techniques such as those utilized in the production of turbochargers can be applied with consequent economies in manufacture. Also, in recent times these components have become very efficient and this feature enables conventional automotive turbocharger design techniques to be applied to the invention.

For low power requirements such as those envisaged for the domestic cogeneration system, the design and use of radial turbines and centrifugal compressors in the apparatus of this invention occurs substantially at the thermodynamic optimum resulting in geometries which have high efficiencies.

Another advantage of this system is the elimination of a fuel pump or fuel compressor. This is a result of combustion occurring at or just below atmospheric pressure. The output power is as a consequence not negated, as it is in a normal gas turbine, by the need to pressurize the fuel with independent equipment.

Starting of the apparatus may be effected with a simple air blower connected for the duration of the start sequence to the air intake of the gas turbine. The air blower creates a higher pressure difference across the turbine than the compressor. This allows the turbine to do work on the compressor, and accelerates the rotation of the shaft, sufficient for a successful start.

BRIEF DESCRIPTION OF THE DRAWINGS

The invention will now be described with reference to the accompanying drawings, in which.

DETAILED DESCRIPTION OF THE PREFERRED EMBODIMENTS

Figure 1:
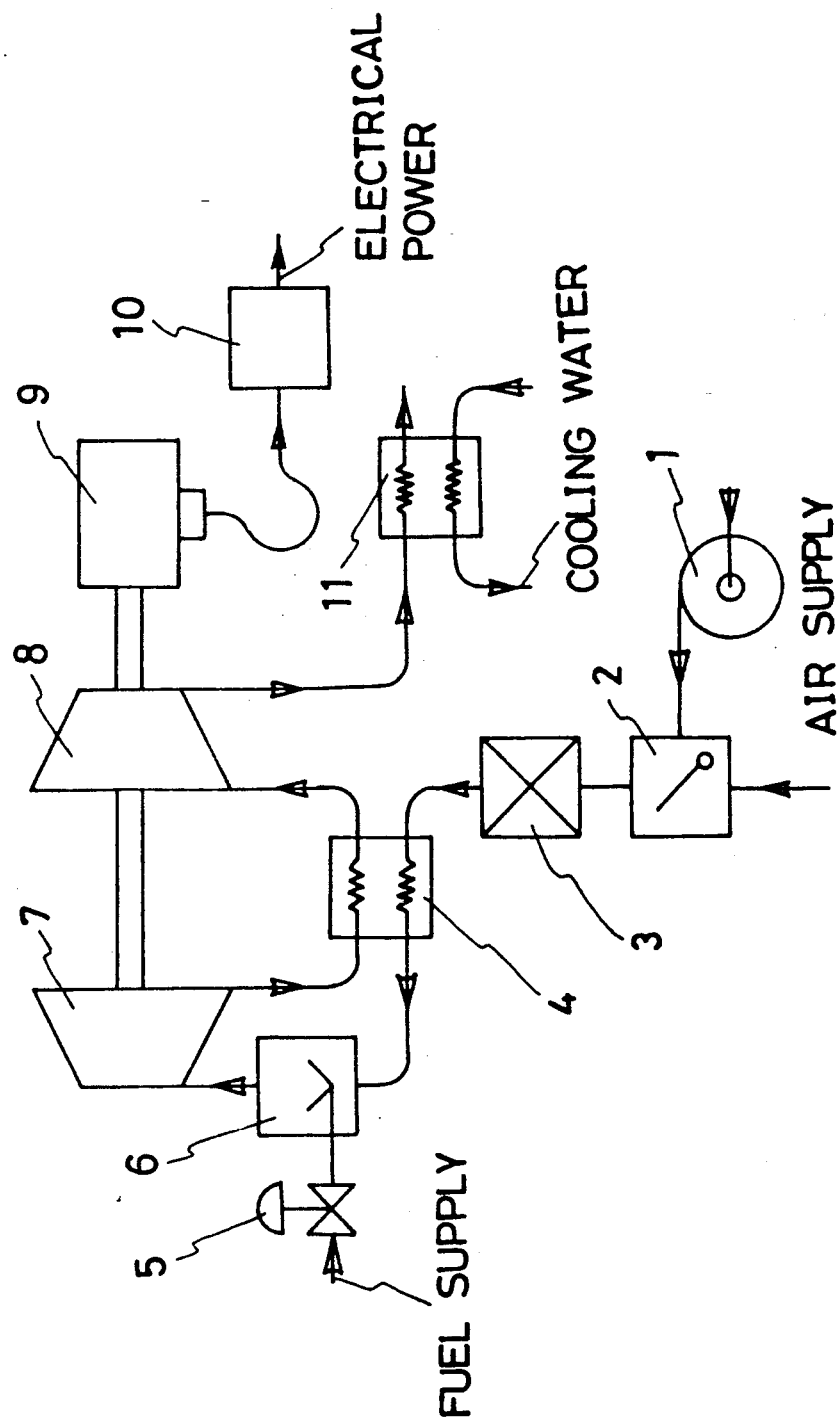
FIG. 1 shows a schematic view of an inverted Brayton cycle PCS having a gas single shaft turbine, together with the equipment necessary to start the engine and recover the electrical and thermal energy.

In FIG. 1 there is shown an inverted Brayton cycle gas turbine engine interfaced with that equipment necessary to produce heat in the form of hot water and electrical power. Not shown is a control unit of the analog or digital type which detects the installation heat and electrical power demands and operates the gas turbine engine as appropriate.

The cycle working fluid is air, the air path being as follows: In normal operation, combustion air is drawn through a flap valve 2. It passes through an air filter 3 and into a cycle heat exchanger 4. It then passes into a combustion chamber 6 where fuel is admitted by a fuel control valve 5 and combusted. The hot combustion gases expand through a turbine 7 which may be radial or axial in design. The combustion gases then pass into the above mentioned heat exchanger 4 where they heat the incoming air and are cooled in the process. The cooled combustion gases are then recompressed to substantially atmospheric pressure in a compressor 8 which may be of the centrifugal-type. The gases after compression are at a temperature higher than ambient and are then passed through another heat exchanger, namely a domestic heat recovery unit 11, which can comprise a gas-to-water heat exchanger, for example.

In the starting condition a small electrically operated blower 1 forces air past the flap valve 2 and through the engine as previously described. The air supply is sufficient to combust with the fuel and start the engine.

Each item in the air/gas path is joined with appropriate duct work.

The expansion turbine 7 is connected via a shaft to the compressor 8 and an electric generator 9. The shaft is supported in bearings which resist radial and axial movement. The generator 9 can comprise an alternator, for example, and the compressor 8 can comprise a centrifugal compressor for example.

The electrical power output from the electrical generator 9 is conditioned by appropriate equipment 10 such as a frequency converter for supplying electricity to a domestic electrical supply source such as a main power supply.

Figure 2:
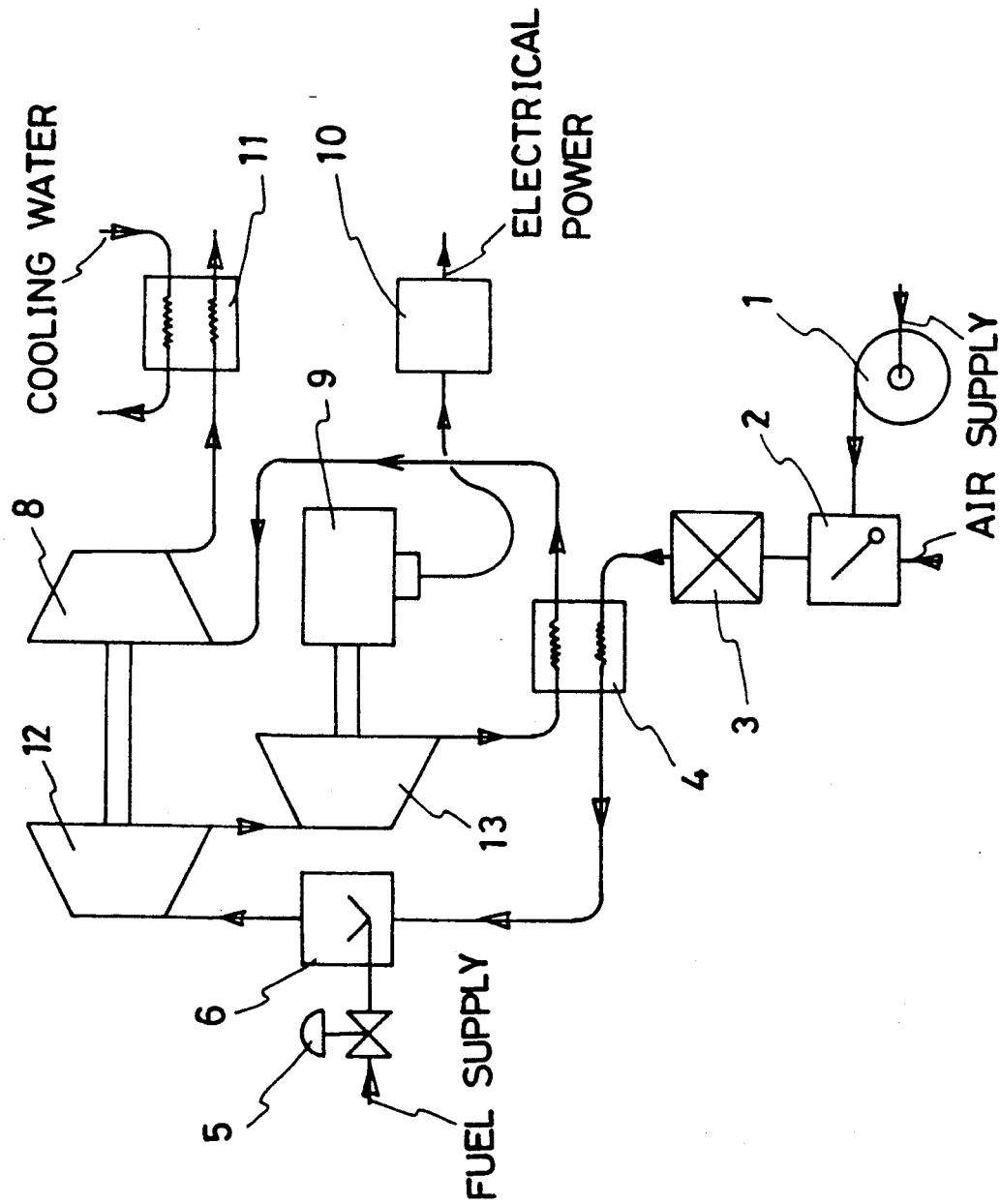
FIG. 2 shows a schematic view of an inverted Brayton cycle PCS having two shaft gas turbines together with the equipment necessary to start the engine and recover the electrical and thermal energy.

FIG. 2 depicts a two turbine design. The mode of operation is the same as that previously described except that instead of the turbine 12 driving both the compressor 8 and the generator 9, a second turbine 13, driving the electrical generator 9, is placed in the hot air stream before the heat exchanger 4 and after the turbine 12 which drives the compressor 8.

A useful and desirable feature, not illustrated in the drawings, is for all of the equipment to be encased in a thermally and acoustically sealed unit thus enhancing the overall appearance and specification.

The invention overcomes the normal disadvantages of conventional gas turbines. However, this is achieved while still retaining a simple construction and an inherently long design life. Noise and vibration can also be virtually eliminated making the invention a superior choice as compared with reciprocating engines designed for the same duty.

While the present invention has been described with reference to the foregoing embodiments, it will be apparent to those skilled in the art that various changes and modifications may be made thereto which fall within the scope of the appended claims.

What is claimed is:

1. An apparatus for the domestic production of electricity, comprising:
    a normal air intake for supplying atmospheric air as combustion air,
    a heat exchanger in which combustion air is preheated;
    means for supplying non-pressurized fuel,
    a combustion chamber in which the non-pressurized fuel is burned in the preheated combustion air at a pressure no greater than atmospheric pressure to form gaseous combustion gases;

a centrifugal compressor;

an electrical generator;

at least one radial turbine in which the gaseous combustion gases are expanded and do work, the at least one turbine being connected to drive the compressor and said electrical generator;

means for starting the apparatus including an electric air blower and a valve which automatically closes the normal air intake during start up, for drawing air from the atmosphere and delivering it through the heat exchanger and combustion chamber to the turbine inlet; and means for passing the gaseous combustion gases from said at least one turbine through said heat exchanger to preheat the combustion air and then to said compressor for recompression.

2. The apparatus according to claim 1, wherein said electrical generator is an alternator.

3. The apparatus according to claim 1, further comprising electrical conditioning equipment for conditioning electrical output of said electrical generator to be suitable for connection to a domestic electrical supply source.

4. The apparatus according to claim 1, further comprising a fuel control valve for controlling the rate of supply of fuel to said combustion chamber.

5. The apparatus according to claim 1, in which said at least one turbine comprises a single turbine which drives both said compressor and said electrical generator.

6. The apparatus according to claim 1, wherein said at least one turbine comprises two turbines, a first one of the turbines driving the compressor and a second one of said turbines driving said electrical generator, the gaseous combustion gases passing through the first and second turbines sequentially.

7. An apparatus for the domestic cogeneration of heat and electricity, comprising:

a normal air intake for supplying atmospheric air as combustion air, a heat exchanger in which the combustion air is preheated;

means for supplying non-pressurized fuel, a combustion chamber in which the non-pressurized fuel is burned in the preheated combustion air at a pressure no greater than atmospheric pressure to form gaseous combustion gases;

a centrifugal compressor;

an electrical generator;

at least one radial turbine in which the gaseous combustion gases are expanded and do work, the at least one turbine being connected to drive the compressor and said electrical generator;

means for starting the apparatus including an electric air blower for drawing air from the atmosphere and delivering it through the heat exchanger and combustion chamber to the turbine inlet air via a valve which automatically closes the normal air intake during start-up;

means for passing the low density gaseous combustion gases from said at least one turbine through said heat exchanger to preheat the combustion air and then to said compressor for recompression; and means for extracting residual heat from the recompressed gaseous combustion gases.

8. The apparatus according to claim 7, wherein said means for extracting residual heat from the recompressed gaseous combustion gases comprises a gas-to-water heat exchanger.

9. The apparatus according to claim 2, wherein said electrical generator is an alternator.

10. The apparatus according to claim 7, further comprising electrical conditioning equipment for conditioning electrical output of said electrical generator to be suitable for connection to a domestic electrical supply source.

11. The apparatus according to claim 7, further comprising a fuel control valve for controlling the rate of supply of fuel to said combustion chamber.

12. The apparatus according to claim 7, in which said at least one turbine comprises a single turbine which drives both said compressor and said electrical generator.

13. The apparatus according to claim 7, wherein said at least one turbine comprises two turbines, a first one of said turbines driving said compressor and a second one of said turbines driving said electrical generator, the gaseous combustion gases passing through the first and second turbines sequentially.

* * * * *